Patented June 30, 1953

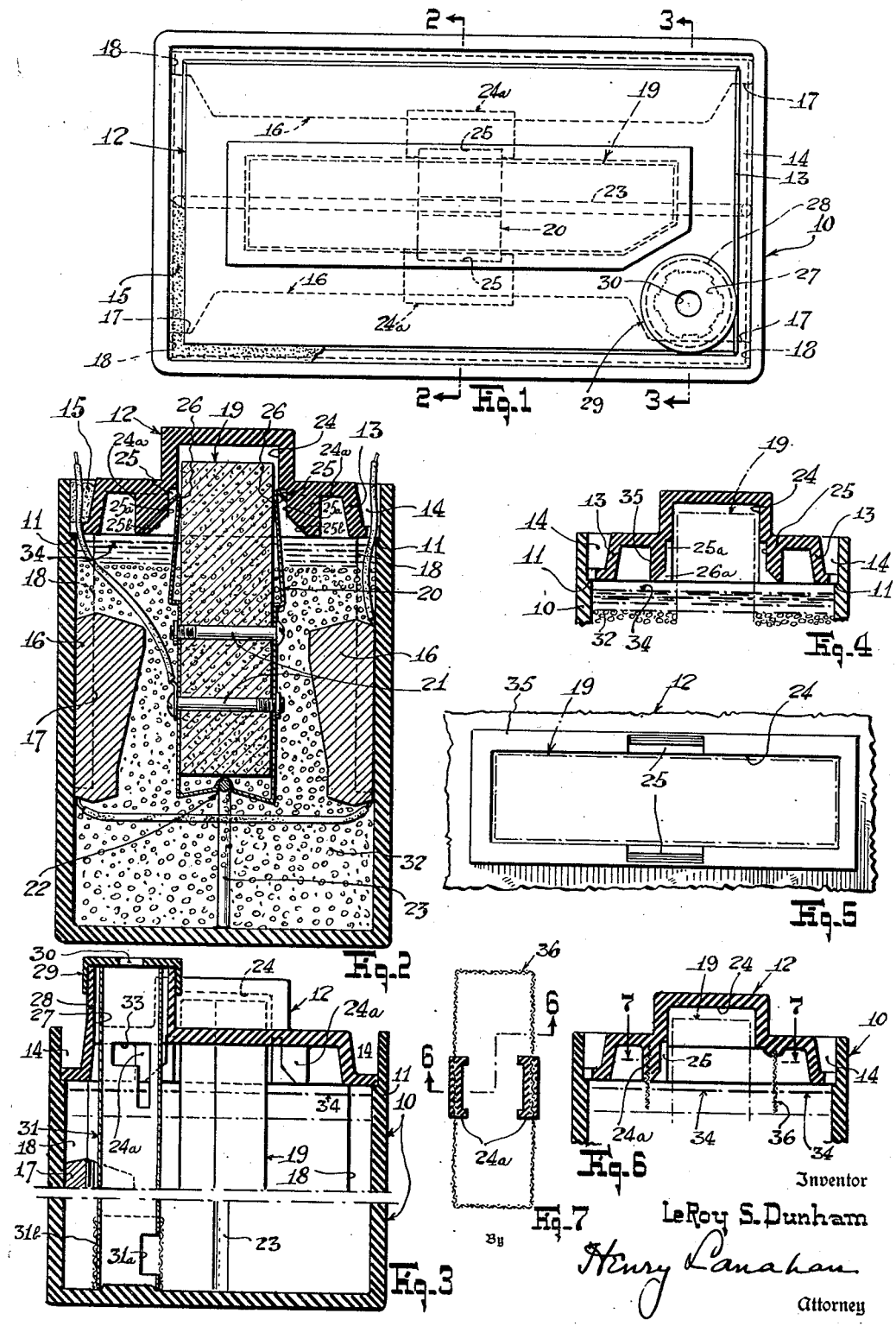
June 30, 1953     LE ROY S. DUNHAM     2,644,025
AIR-DEPOLARIZED PRIMARY CELL
Filed Nov. 10, 1951

2,644,025

UNITED STATES PATENT OFFICE 2,644,025

AIR-DEPOLARIZED PRIMARY CELL

Le Roy S. Dunham, East Orange, N. J., assignor to Thomas A. Edison, Incorporated, West Orange, N. J., a corporation of New Jersey Application November 10, 1951, Serial No. 255,820

12 Claims. (Cl. 136—136)

This is a continuation-in-part application of my application Serial No. 193,423, filed November 1, 1950, and entitled "Air-Depolarized Primary Cell," now being abandoned upon the filing of this application.

This invention relates to primary cells of the air-depolarized type and more particularly to primary cells of this type which use a porous air-depolarizing cathode and an alkaline electrolyte.

In air-depolarized primary cells of the type mentioned, oxygen of the atmosphere is conducted through the porous cathode to the interface between the cathode and the electrolyte, whereat the oxygen combines with the polarizing hydrogen gas to form water and to depolarize the electrode. This depolarizing action can proceed only so long as the pores of the cathode are kept open. In an air-depolarized primary cell of the usual construction wherein the top end of the cathode body is exposed directly to the outside air, there is the possibility that during use the exposed carbon face may be covered with dirt and water especially if the cell is unprotected from elements of the weather; also, there are strong tendencies for undesired elements of the atmosphere such as water vapor and carbon dioxide to be drawn into the cathode body. Water vapor tends to clog the pores directly while carbon dioxide combines with the alkaline electrolyte, especially if the electrolyte is sodium hydroxide, to produce carbonates which not only clog the pores but which also form deposits, particularly at cold temperatures, that expand with changing conditions of temperature and humidity of the outside atmosphere to create internal disrupting pressures within the cathode.

My invention resides in an improved cell construction having a protective enclosure for the carbon cathode, which shields the cathode from contact with dirt, water, etc. of the atmosphere and also from direct contact with the gaseous elements of the atmosphere. This protective enclosure or equivalent means is in association with the exposed surface of the aqueous electrolyte solution to prevent undesired gaseous elements of the atmosphere, such as water vapor and carbon dioxide, from being absorbed by the cathode. More particularly, this improved cell construction is arranged so that the air, in its transit from the atmosphere to the cathode, is led over a surface of an aqueous caustic alkaline solution, preferably the electrolyte solution of the cell itself, to scavenge the transit air of carbon dioxide and to equalize the water vapor pressure thereof with that existing at the interface between the electrolyte solution and the cathode, before the transit air reaches the cathode. In this way, carbon dioxide is effectively prevented from reaching the cathode, and also the water vapor which contacts the cathode is prevented from being absorbed because no differential pressure as to water vapor will exist in the cathode.

It is therefore an object of my invention to provide an improved construction of air-depolarized primary cell which is adapted to increase the life of the porous cathode and to render it more efficient in its depolarizing action.

It is another object to provide an improved construction of such primary cell wherein actions tending to clog the pores of the cathode body are greatly minimized.

It is another object to provide an improved construction of air-depolarized cell wherein the cathode is effectively shielded from dirt, water, etc. of the atmosphere and from direct contact with gaseous elements of the atmosphere.

It is a further and more specific object of my invention to reduce in such a primary cell the tendency of the cathode to be wetted by seepage of the electrolyte and by condensation of water vapor from the atmosphere.

A further object of my invention is to minimize undesired chemical and physical interactions in the porous cathode body such as will produce insoluble deposits that will clog the pores and create internal disrupting pressures.

A still further and specific object allied with the foregoing is to so arrange the construction of such primary cell as to substantially preclude undesirable elements of the atmosphere such as carbon dioxide from reaching the cathode.

As will be apparent from the following description, the foregoing objects are accomplished by a cell construction wherein the cathode is exposed indirectly to the atmosphere by way of an air space having direct surface contact with the electrolyte solution and a relatively-limited contact or communication with the outside air.

In describing the invention, reference is had to the accompanying drawings, of which:

Figure 1 is a top plan view of a primary cell embodying my invention;

Figure 2 is a vertical section taken substantially on the line 2—2 of Figure 1;

Figure 3 is a fractional sectional view as seen from the line 3—3 of Figure 2;

Figure 4 is a fractional vertical sectional view, to reduced scale, illustrating a modification of my invention;

Figure 5 is a bottom plan view of a portion of the cover of the embodiment shown in Figure 4;

Figure 6 is a view similar to Figure 4, and taken on the line 6—6 of Figure 7, showing another embodiment; and Figure 7 is a fractional sectional view as seen from the line 7—7 of Figure 6.

Purely by way of illustration, I herein show and describe my invention in connection with the form of air-depolarized primary cell shown and claimed in my pending application Serial No. 151,743 filed March 24, 1950. Such primary cell comprises a case 10 the upper rim of which is filleted to provide an interior ledge 11 on which a top cover 12 is seated. The cover has an outwardly-flared downwardly-extending skirt 13 near its rim forming a narrow channel 14 with the upper portion of the side walls of the case. This channel is filled with pitch 15 or other sealing compound to seal the cover airtight to the case.

A pair of zinc anodes 16 are mounted in the upper portion of the case at opposite sides thereof. These anodes are supported by extending lugs 17 at the ends thereof which seat on the lower ends of vertically-extending interior recesses 18 in the end walls of the case.

Positioned midway between the anodes is a block-shaped cathode 19 of suitable air-depolarizing material. A U-shaped metal strap 20 embraces the sides and bottom of this cathode and is secured to the cathode by two clamping bolts 21 which pass through the cathode and through the intermediate portions of the two upstanding side legs of the strap. The bottom portion of this strap is formed with a groove 22 which is open downwardly to receive a rod 23 for supporting the cathode vertically. The cathode is maintained in an upright position as by a loose engagement of the top portion thereof with a central internal recess 24 provided in the cover 12. At opposite sides of this recess, there are depending lugs 24a, in the adjacent walls of which there are vertical grooves 25 which run out through the bottom of the lugs. The upper portions 25a of these grooves have uniform depth and the lower portions 25b thereof have increasing depth as one proceeds towards the lower open ends of the grooves. The upper portions of the strap 20, which extend above the clamping bolts 21, are biased outwardly slightly away from the adjacent walls of the cathode and terminate in outwardly- and downwardly-extending lugs 26 which engage the grooves 25. As the cover is seated on the case while the cathode is resting on the cross rod 23, the lugs 26 first engage the inclined walls of the lower groove portions 25b, to cam the straps inwardly against the cathode, and then the lugs are slid upwardly along the upper groove portions 25a to place the upper portion of the cathode in an intermediate position within the recess 24. Also, the lugs 26 bind against the bottom walls of the grooves 25a, when any downward force is exerted on the cathode relative to the cover, so as to attach the cathode to the cover and give it vertical support at the top. As so arranged, there is an air space around and over the top portion of the cathode, which is in communication with the air space in the container standing over the electrolyte. Although I preferably enclose the cathode wholly within the container as here shown, it will be understood that modifications of this arrangement may be employed so long as the cathode is shielded from direct contact with the atmosphere in accordance with the principles of my invention.

In a corner portion of the cover displaced from the cathode there is a filler opening 27 surrounded by an upstanding flange 28 onto which is fitted a cap 29. This cap has a central breather opening 30 for ventilating the cell.

As is described in my pending application above-mentioned, a filler tube 31 is preferably extended from the filler opening 27 downwardly to the bottom of the cell, whereat it has an outlet opening 31a covered by a screen 31b for egress of liquid as it is poured through the filler opening 27. The provision of such tube is of particular importance in deferred-action add-water cells of the type filled with a granular mass 32 of lime and/or dry electrolyte ingredient as described in my Patent No. 2,450,472 issued October 5, 1948. Such filler tube may engage the filler opening 27 loosely to provide a ventilating space between the tube and the rim of the cover surrounding the filler opening 27. However, the filler tube is provided with a side opening 33 in its upper portion at a level above the granular mass 32, not only to provide a principal communication between the air space in the case and the outside atmosphere via the filler cap opening 30 but also to provide an outlet for equalizing the level of liquid in the tube with that in the case outside the tube at the end of a filling operation, as is explained in the pending application abovementioned.

The granular mass 32 above referred to is preferably a mixture of granular lime and dry alkaline electrolyte ingredient, but is not limited thereto for the purposes of the present invention. Also, while I preferably use such granular mass, it will be understood that my invention is not limited thereto.

To activate the present cell when dry electrolyte ingredient is contained within the granular mass 32, the operator adds water through the filler tube until the water rises from the bottom of the case to a level 34 substantially above the granular mass. This water dissolves the dry electrolyte as it rises and forms a liquid alkaline electrolyte solution for the cell. Preferably, the side opening 33 in the filler tube is extended below the level of the electrolyte for reasons which will be hereinafter apparent. Thus, in this cell construction a lower portion of the cathode is bathed by liquid electrolyte and the upper portion is bathed by an air space wholly within the case between the electrolyte solution and the cover, which air space has communication with the outside atmosphere only via the cap vent opening 30. However, one or more of such outlet openings to the outside atmosphere may be provided within the limitations of the invention hereinafter fully explained.

In the prior constructions of air-depolarized primary cells wherein the cathode is exposed directly to the outside atmosphere, there is a strong tendency for water vapor to be absorbed gradually by the cathode, causing ultimately the pores thereof to be clogged with water and the cathode to be rendered useless. This is because in the pores of the cathode at its interface with the electrolyte solution the water vapor pressure stands in equilibrium with the electrolyte solution at all times; however, in the pores of the cathode at its interface with the outside atmosphere the vapor pressure varies with the humidity of the atmosphere, being sometimes greater and sometimes smaller than that at the interface with the electrolyte solution, to cause water vapor to be drawn in at one end or the other of the cathode in response to a partial pressure drop of water vapor within the cathode. With varying temperatures, this water vapor condenses to cause internal wetting and ultimate clogging of the pores with resultant disabling of the cathode for further use.

Furthermore, in these prior constructions of air-depolarized cells undesired elements of the atmosphere, such as carbon dioxide, contact the exposed surface of the cathode and permeate therethrough. This permeation is a continuous process, and takes on the character of a continuous absorption of carbon dioxide by the cathode, because the carbon dioxide gas has great affinity for alkaline electrolyte and reacts readily therewith when it reaches the gas-electrolyte interface. Such absorbed carbon dioxide will meet with electrolyte solution firstly at the interface of the cathode with the electrolyte solution and later at inner regions of the cathode as electrolyte is gradually absorbed thereby during use of the cell. At these meeting places the carbon dioxide and electrolyte solution combine to produce carbonates. These carbonates are very harmful if the electrolyte is a caustic soda solution because sodium carbonate is an insoluble compound which gradually clogs the pores of the cathode. But still more harmful than the insolubility of sodium carbonate is the fact that it is capable of existing in many states of hydration having different volumes and that it shifts between these states with changes in temperature and humidity. Whenever the deposits of sodium carbonate in the pores of the cathode undergo volume expansion, high internal pressures develop to cause disruption and multiple fractures of the carbon. Although potassium carbonate does not tend to create such disruptive internal pressures in view of this carbonate being fairly soluble, my invention is nevertheless advantageous in cells using potassium hydroxide as the electrolyte because my invention enables the cathode to be protected from dirt, water, etc. of the atmosphere and it reduces substantially the tendency for water vapor to penetrate the cathode and to produce internal wetting thereof.

By my invention, absorption by the cathode of water vapor and the formation therein of carbonates are well-nigh wholly prevented by maintaining the entire cathode body in equilibrium as to water vapor and by scavenging the air of undesired elements such as carbon dioxide as the air moves from the atmosphere to the cathode. These results are accomplished by intimately contacting the transit air with an aqueous solution of caustic alkali, preferably the electrolyte itself of the cell. Various constructions may be utilized in carrying out my invention but each of these constructions will be characterized by one or more of the following features inherent in the illlustrative embodiment of my invention herein described, to wit: (1) a shielding of the entire cathode from direct contact with the atmosphere preferably by placing it wholly within a cell container closed from the atmosphere except for a breather opening; (2) a bathing of the upper portion of the cathode in a relatively confined air space which has limited communication with the outside atmosphere, (3) an exposure of this air space to direct contact with the electrolyte solution of the cell or equivalent liquid body either by extending it over the same in direct contact therewith or by directing the air thereover in its transit from the outside atmosphere to the cathode, and (4) by offsetting the breather opening for entrant air away from the cathode. Specifically, in the embodiment herein shown and described, the air space in the case standing over the electrolyte solution has communication with the outside atmosphere only by way of the filler cap opening 30. To assure that the vapor pressure in this air space will be substantially in equilibrium with the electrolyte solution, the area of contact of this air space with the electrolyte is made substantially greater than the cross sectional area of the filler cap opening—which is the point of smallest cross section of the transit path of the outside atmosphere to the cathode. Also, in this specific construction, at least the principal portion of the entrant air is directed, by the filler tube 31 and side opening 33 thereof, across the electrolyte solution standing normally in the tube and opening. By such intimate contact of the entrant air with the electrolyte solution, any carbon dioxide of the air is combined with the exposed electrolyte to form carbonates and is precluded therefore from reaching the cathode body. Even if some carbon dioxide should escape coming into intimate contact with the electrolyte at or around the filler opening and tube 31 whereat the carbon dioxide is at maximum concentration, it will likely contact the electrolyte and combine therewith, because of its affinity for caustic alkaline solution, in its transit from the air inlet opening to the cathode. At least, the carbon dioxide concentration in the air space will tend to be weaker as one proceeds nearer to the cathode. This is in contradistinction to the prior construction of primary cells wherein the carbon dioxide in the cathode body has at least as great a concentration as it has in the atmosphere contacting the cathode body.

In accordance with the modification shown in Figures 4 and 5, an anti-splash baffle 35 is provided wholly around the cathode in spaced relation thereto, and is in the form of a flange extending downwardly from the cover to a point near the electrolyte solution level. This baffle is a solid wall constituting in effect an extension of the lugs 24a around the whole cathode. By extending the baffle downwardly to nearly the level of the electrolyte solution, the baffle not only prevents splashing of the electrolyte solution against the upper portion of the cathode, should the cell be jarred or tilted slightly as during transportation, but also the baffle directs the entrant air to the cathode into more intimate association with the electrolyte solution to assure more complete reaction of the electrolyte solution with undesired ingredients of the air such as carbon dioxide; still further, the baffle provides an inner gas chamber around the cathode having still greater contact with the electrolyte solution than with the outside atmosphere to assure a vapor pressure at the cathode which is more nearly in equilibrium with the vapor pressure of the cathode at its interface with the electrolyte solution.

In another embodiment shown in Figures 6 and 7, a baffle member is provided around the cathode in the form of a screen 36 which is secured at the top to the cover as by molding the upper portion of the screen therein. This screen is extended downwardly below the electrolyte solution level. Such a baffle screen is effective not only to prevent splashing of the electrolyte solution against the cathode under the conditions abovementioned, but also it normally provides a substantially greater area of contact of the entrant air to the cathode with the electrolyte solution since the screen will be wetted normally by the electrolyte solution. Such greater area of contact of the air with the electrolyte solution assures a well-nigh complete reaction of all carbon dioxide of the air with the electrolyte.

Although the carbonates which are formed by the carbon dioxide of the entrant air with the electrolyte solution are at the expense of the electrolyte and do constitute electrolyte contaminants, they are not particularly deleterious when present in the free volume of electrolyte solution because of the relatively great amount of electrolyte solution provided in a normal primary cell.

In the claims the phrase "shielded or closed from direct contact with the atmosphere," as used in connection with the cathode, is to be interpreted to mean that the solid particles carried in the atmosphere are prevented from contacting the cathode and that the air in direct contact with the cathode is conditioned as to vapor pressure and scavenged of any undesired gaseous constituents.

The foregoing description and drawings are intended to be illustrative and not limitative of my invention since the particular embodiments shown are subject to changes and modifications without departure from the scope of my invention, which I endeavor to express according to the following claims.

I claim:

1. A battery of the air-depolarizing type comprising a container, an aqueous electrolyte solution partially filling said container, an air space in said container standing over said electrolyte solution in contact therewith, an air-depolarizing cathode in said container and shielded from direct contact with the atmosphere, said cathode being bathed in part by said air space and in part by said solution, means for admitting outside air into contact with said cathode, said means being constructed and arranged to provide paths for transit air from the outside atmosphere to said cathode bounded in part by said electrolyte solution whereby the entrant air will contact said solution before reaching the cathode, said contact of entrant air with the electrolyte solution being sufficiently great to maintain substantially an equilibrium between said air space and the electrolyte solution as to vapor pressure.

2. An air-depolarized primary cell comprising a container, a porous air-depolarizing cathode in said container, cover means on said container closing said cathode from direct contact with the atmosphere, a caustic soda solution in a lower portion of said container contacting the lower portion of said cathode, and means for ventilating the upper portion of said cathode with the atmosphere, comprising a conduit for transit air from the outside atmosphere to said cathode bounded in part by said electrolyte solution to cause entrant air to contact the electrolyte solution so that carbon dioxide of the entrant air will react with the electrolyte solution before it reaches the cathode, and the portion of said conduit bounded by said electrolyte solution having sufficient contact area with the latter to equalize substantially the vapor pressure of the transit air with that existing at the interface between the cathode and the electrolyte soution.

3. An air-depolarized primary cell comprising a covered container, a porous air-depolarizing cathode disposed wholly within said container, an aqueous electrolyte solution in the lower portion of said container contacting the lower portion of said cathode, an air space in the upper portion of said container above said electrolyte solution contacting an upper portion of said cathode, said container having a breather opening for said cell, and means associated with said opening for directing entrant air from the outside atmosphere into contact with said electrolyte solution before said air reaches said cathode.

4. The combination set forth in claim 3 wherein said last-stated means comprises a conduit extending inwardly of the case from said filler opening and having an outlet to said air space in proximity with the top surface of said electrolyte solution.

5. An air-depolarized primary cell comprising a container, a porous air-depolarizing cathode in said container, means associated with said container to shield the cathode from direct contact with the atmosphere, an aqueous electrolyte solution in a lower portion of said container contacting the lower portion of said cathode, an air space in the upper portion of said container above said electrolyte solution contacting the upper portion of said cathode, said container being adapted to provide a communication between said air space and the outside atmosphere only at points offset from said cathode, and a baffle between said points of entrant air and said cathode in surrounding relation with the upper portion of the cathode and spaced therefrom, said baffle depending from the cover of said container into proximity with the electrolyte solution to require entrant air to the cathode to pass closely over the surface of said electrolyte solution.

6. A primary cell of the air-depolarized type comprising a container, an electrolyte solution in a lower portion of said container and an air space in the upper portion thereof contacting said electrolyte solution, an air-depolarizing cathode in said container and shielded from direct contact with the atmosphere, said cathode having one portion contacting said electrolyte solution and another portion contacting said air space, and said container being constructed and arranged to provide only communication paths from the outside air to said cathode via the portion of said air space bounded by said electrolyte solution for causing the entrant air to contact said electrolyte solution before it reaches said cathode.

7. A primary cell of the air-depolarized type comprising a covered container, an aqueous electrolyte solution in a lower portion of said container and an air space in the upper portion thereof in contact with said electrolyte solution, an air-depolarizing cathode wholly within said container and having a portion thereof immersed in said electrolyte solution and a portion thereof projecting above the electrolyte solution into said air space, and a sole breather opening in said covered container providing communication between said air space and the outside atmosphere, said breather opening being offset from said cathode and having a minor cross sectional area relative to the surface area of the interface between said air space and said electrolyte solution.

8. An air-depolarized primary cell including an air-depolarizing cathode, an aqueous alkaline electrolyte solution contacting a portion of said cathode, and closure means containing said electrolyte solution and closing said cathode from direct contact with the atmosphere, said closure means providing an air space therein around said cathode and having an opening for limited communication of said air space with the outside atmosphere, said air space being in intimate contact with said electrolyte solution, and said limited communication being such in relation to the area of contact of the air space with the electrolyte that the vapor pressure in said air space is maintained substantially in equilibrium with said electrolyte solution.

9. An air-depolarized primary cell comprising a porous air-depolarizing cathode, a container with closure means for closing said cathode from direct contact with the atmosphere, an aqueous caustic soda solution in said container and in which a lower portion of said cathode is immersed, an air space in the upper portion of said container contacting said electrolyte solution and the upper portion of said cathode, and means on said container providing communication between the outside atmosphere and said air space only at points displaced from said cathode whereby deleterious carbon dioxide of the entrant air will contact said caustic solution and react therewith without reaching said cathode, and said air space having a substantially greater area of contact with said electrolyte solution than is the cross sectional area of the communication between the air space and the outside atmosphere whereby to cause the vapor pressure in said air space to be substantially in equilibrium with that existing in the porous cathode at its interface with the electrolyte solution.

10. A battery of the air-depolarizing type comprising a container, a caustic soda solution partially filling said container, an air space in the upper portion of said container and in contact with said solution, an air-depolarizing cathode in said container bathed in part by said air space and in part by said solution, means on said container shielding said cathode from direct contact with the atmosphere, said container having openings providing communication between the atmosphere and said air space only at points offset from said cathode for causing the entrant air to contact said caustic soda solution before it reaches said cathode, said contact of entrant air with the caustic soda solution being sufficiently great to decrease substantially the concentration of carbon dioxide in said air space relative to the concentration of carbon dioxide in the outside atmosphere.

11. A cell construction of an air-depolarizing type comprising a covered container; elements in said container comprising an anode, an electrolyte, an air-depolarizing cathode and an air space, said air space being in direct contact with said electrolyte and said cathode being so disposed that one portion thereof contacts said electrolyte and another portion thereof contacts said air space; and means on said container forming an opening for communication of the outside air with said air space and for causing the entrant air into said container to contact said electrolyte substantially before the same reaches said cathode.

12. The combination set forth in claim 11 wherein said electrolyte is an aqueous caustic soda solution having a strong affinity for carbon dioxide gas in the entrant air passing from said opening to said cathode, and wherein said communication-opening means provides a limited communication of said air space with the outside atmosphere adapted to maintain said air space substantially in equilibrium with said electrolyte solution as to vapor pressure.

LE ROY S. DUNHAM.

References Cited in the file of this patent

UNITED STATES PATENTS

| Number | Name | Date |
|---|---|---|
| 1,673,198 | Martus et al. | June 12, 1928 |
| 2,044,123 | Oppenheim | June 16, 1936 |
| 2,051,987 | Domizi | Aug. 25, 1936 |
| 2,085,269 | Oppenheim | June 29, 1937 |

FOREIGN PATENTS

| Number | Country | Date |
|---|---|---|
| 184,841 | Great Britain | Aug. 21, 1922 |
| 839,800 | France | Apr. 12, 1939 |